United States Patent
Sohma et al.

(10) Patent No.: US 8,483,532 B2
(45) Date of Patent: Jul. 9, 2013

(54) LOW ADHESION PLASTIC-CLADDING OPTICAL FIBER

(75) Inventors: Kazuyuki Sohma, Yokohama (JP); Takashi Takada, Yokohama (JP); Itaru Sakabe, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 146 days.

(21) Appl. No.: 13/013,128

(22) Filed: Jan. 25, 2011

(65) Prior Publication Data

US 2011/0182556 A1 Jul. 28, 2011

(30) Foreign Application Priority Data

Jan. 26, 2010 (JP) .................. 2010-014454

(51) Int. Cl.
G02B 6/02 (2006.01)
(52) U.S. Cl.
USPC ............. 385/123; 385/14; 385/128; 385/131; 385/132; 385/142; 385/145
(58) Field of Classification Search
None
See application file for complete search history.

(56) References Cited

U.S. PATENT DOCUMENTS

| | | | |
|---|---|---|---|
| 6,222,972 B1 * | 4/2001 | Yamamoto et al. | 385/127 |
| 6,810,188 B1 * | 10/2004 | Suzuki et al. | 385/128 |
| 7,422,375 B2 * | 9/2008 | Suzuki et al. | 385/58 |
| 2003/0049006 A1 * | 3/2003 | Aikawa et al. | 385/128 |
| 2009/0175585 A1 * | 7/2009 | Makino et al. | 385/129 |

FOREIGN PATENT DOCUMENTS

| | | |
|---|---|---|
| JP | 01-224703 A | 9/1989 |
| JP | 2001-264597 | 9/2001 |
| JP | 2002-201048 | 7/2002 |
| JP | 2004-341297 A | 12/2004 |
| JP | 2008-046566 | 2/2008 |
| JP | 2009-132800 | 6/2009 |

OTHER PUBLICATIONS

Notification of Reasons for Refusal JP 2010-014454, Dispatched Dec 13, 2011.*
Akira Murata et al., "Small Diameter Polymer Clad Fiber for Short Distance Transmission," The Proceedings 2 of 2007 Society Conference of the Institute of Electronics, Information and Communication Engineers, Aug. 29, 2007, p. 320, B-13-21.
Takeshi Okada et al., "Polymer Clad Fiber for Short Distance Transmission," The Study Report of Society Conference of the Institute of Electronics, Information and Communication Engineers, OFT2007-48 ~ 61 [Optical Fiber Applied Technology], pp. 25-28, vol. 107, No. 451.

* cited by examiner

*Primary Examiner* — Brian Healy
*Assistant Examiner* — Andrew Jordan
(74) *Attorney, Agent, or Firm* — Drinker Biddle & Reath LLP

(57) ABSTRACT

A plastic-cladding optical fiber is provided. The plastic-cladding optical fiber is provided includes: a core layer made of quartz glass; and a cladding layer formed by hardening a curable resin composition over a periphery of the core layer. Adhesion between the core layer and the cladding layer ranges 1.5 g/mm to 4.0 g/mm.

5 Claims, 5 Drawing Sheets

LOW ADHESION PLASTIC-CLADDING OPTICAL FIBER

This application claims priority from Japanese Patent Application No. 2010-014454, filed on Jan. 26, 2010, the entire content of which is hereby incorporated by reference.

FIELD OF THE INVENTION

The present invention relates to a plastic-cladding optical fiber provided with a cladding layer on a periphery of a core layer.

DESCRIPTION OF RELATED ART

One type of optical fiber is called a plastic-cladding optical fiber. The plastic-cladding optical fiber has: a core layer made of quartz-based glass such as pure silica; and a cladding layer made of plastic that is laid over a periphery of core glass. The plastic-cladding optical fiber having such a structure is usually made through the following operations. A quartz-based glass matrix is fused and drawn by means of a fiber drawing machine, to thus form a core layer of an optical fiber. Subsequently, a periphery of the core layer is coated with a curable resin which is to become a cladding layer, by means of a coating dice, or the like. The thus-coated layer is hardened, thereby forming the plastic-cladding optical fiber.

When exfoliation has occurred in an interfacial surface between the cladding layer and the core layer, a decrease arises in a strength of a thus-exfoliated area because of a layered structure of the plastic-cladding optical fiber. Then, it turns results in occurrence of deterioration, like a crack in the core layer. Therefore, maintaining interlayer adhesion has been considered as an important issue. An optical fiber core wire proposed in Japanese Patent Application Publication No. JP-A-2002-201048, inhibits occurrence of a decrease in adhesion between the core layer and the cladding layer, which would otherwise be caused by a change in a working temperature of an environment where the optical fiber is laid. An optical fiber core wire proposed in Japanese Patent Application Publication No. JP-A-2001-264597 prevents occurrence of protrusion of a bare fiber line, which would otherwise be caused by a decrease in adhesion between the core layer and the cladding layer for reasons of a change in working environmental temperature.

Such a plastic-cladding optical fiber has been laid for short distance optical transmission within a facility such as a factory, in many instances. Once laid, the plastic-cladding optical fiber is used as it is for a long period of time and will not be frequently laid again. The optical fiber core wires proposed in JP-A-2002-201048 and JP-A-2001-264597 are premised on such working conditions.

When a plastic-cladding optical fiber is employed as a cable for connection with a device personally used or used at home, like an optical composite USB cable and an HDMI cable, the cable is frequently attached and detached every time the device is used. Moreover, there is no warranty of gentle use of the cable. For these reasons, possession of a fatigue property that makes the cable endure rigorous working conditions becomes very important. Specifically, even when diverted, the optical fibers designed for stationary use described in JP-A-2002-201048 and JP-A-2001-264597 cannot withstand such a use, and failure is considered to occur in association with exfoliation developed in layers.

SUMMARY OF INVENTION

Illustrative aspects of the present invention provide a plastic-cladding optical fiber possessing a fatigue property that enables the fiber to withstand repeated attachment and detachment in a working environment where attachment and detachment are frequently repeated.

According to a first aspect of the invention, a plastic-cladding optical fiber includes: a core layer made of quartz glass; and a cladding layer formed by hardening a curable resin composition over a periphery of the core layer. Adhesion between the core layer and the cladding layer ranges 1.5 g/mm to 4.0 g/mm (claim 1).

According to a second aspect of the invention, the fiber may be usable at a bend radius of 2.5 mm (claim 2).

According to a third aspect of the invention, a diameter of the core layer may range from 50 µm to 100 µm, and a thickness of the cladding layer may range from 12 µm to 38 µm (claim 3 and 4).

DETAILED DESCRIPTION OF EXEMPLARY EMBODIMENT

In a case of a plastic-cladding optical fiber based on the assumption that the fiber is frequently subjected to external force; in particular, bend stress, controlling the fatigue property is considered to be important as mentioned above. A fatigue coefficient (hereinafter called an n-value) is available as one index showing a fatigue property of the optical fiber. The n-value is one of parameters representing strength relevant to growth speed of cracks in a surface of an optical fiber and a numeral used as an index showing guarantee of reliability against failure of an optical fiber, which would otherwise arise when the optical fiber is subjected to repeated stress and stress fluctuations. A correlation exists between the n-value and a failure probability of the optical fiber. As the n-value increases, the numeral value of failure probability decreases (namely, the fiber becomes less susceptible to failure). Therefore, the n-value is inversely calculated from requested failure probability, whereby reliability of the optical fiber can be guaranteed.

By means of dedicated studies that have been conducted to accomplish the object, the present inventors found that a desired n-value can be acquired by determining adhesion while attention is paid to a relationship between the n-value of the plastic-cladding optical fiber and adhesion of an interfacial surface between layers, which in turn makes it possible to assure required failure probability. Thus, the present invention has been completed.

Figure 1:
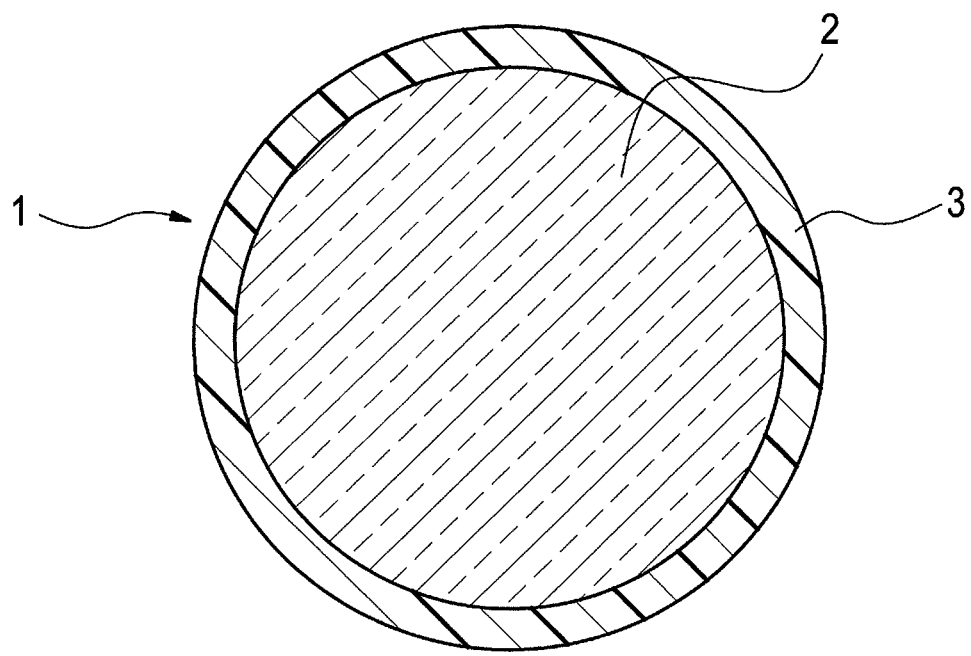
FIG. 1 is a schematic cross sectional view showing an example plastic-cladding optical fiber of the present invention.

A plastic-cladding optical fiber of the present invention is hereunder described in detail by reference to the drawings. FIG. 1 is a schematic cross sectional view showing an example plastic-cladding optical fiber of the present invention. The plastic-cladding optical fiber 1 has a cladding layer 3 that is formed by hardening an UV curable resin, or the like, over a periphery of a core layer 2 made of quartz-based glass, such as pure silica. For instance, an outer diameter of the core layer 2 can be set to 50 μm to 100 μm, and a thickness of the cladding layer 3 can be set to 12 μm to 38 μm (an outer diameter of the cladding layer 3 is 125 μm). In particular, when an optical fiber is used for an optical composite USB cable for home and an HDMI cable, in order to reduce a minimum bend radius to facilitate handling of the cable, it is preferable to set the outer diameter of the core layer 2 to 50 μm to 90 μm and set the thickness of the cladding layer 3 to 17 μm to 38 μm (the outer diameter of the cladding layer 3 is set to 125 μm), thereby making the radius of the cable comparatively small. The minimum bend radius will be described in detail later.

Adhesion of the interfacial surface between the core layer 2 and the cladding layer 3 is 1.5 g/mm to 4.0 g/mm. Exfoliation, which would otherwise be induced when external force is exerted on the plastic-cladding optical fiber, can be prevented by setting the adhesion to such value. Specifically, when external force, in particular, bending strain, has occurred on the plastic-cladding optical fiber 1, shearing stress acts on an outer interfacial surface of the cladding layer 3 in a curved portion, and compression stress develops in an inner interfacial surface in the curved portion. Thus, force that exfoliates the cladding layer 3 from the core layer 2 acts on the curved portion. For these reasons, if adhesion of the interfacial surface is weak, the cladding layer 3 will be exfoliated from the core layer 2. In particular, when the inner interfacial surface of the cladding layer 3 covering the core layer 2 is exfoliated, a bend whose diameter is smaller than a diameter of another area develops in the core layer 2 in the exfoliated area. The cladding layer 3 that should have acted as a buffer material is exfoliated, to thus make a void. Accordingly, occurrence of minute cracks in the exfoliated area quickly proceeds, thereby increasing the possibility of occurrence of failure. Therefore, in order to inhibit occurrence of failure when the cladding layer 3 is exfoliated by exerting bend stress on the cladding layer 3, adhesion of the interfacial surface must be set to the values mentioned above.

Figure 2:
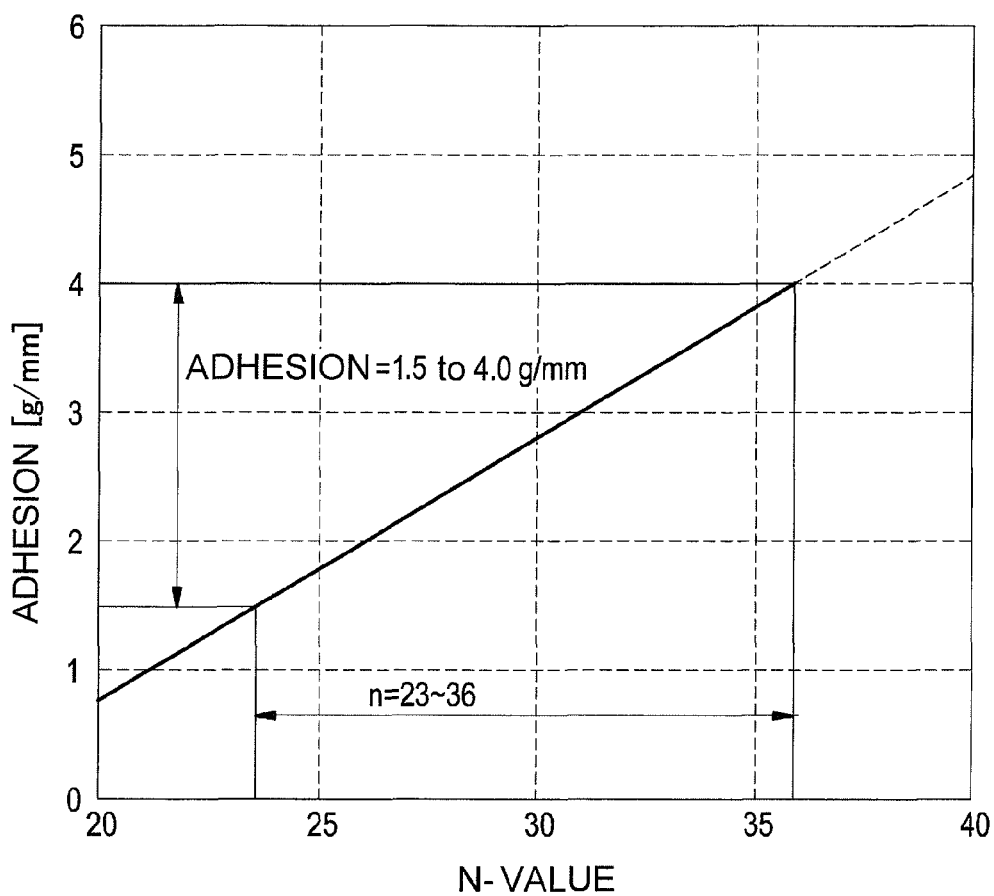
FIG. 2 is a graph showing a relationship between an n-value and adhesion of an interfacial surface.

An n-value can be used as a parameter for grasping a possibility of failure when strain occurs in the plastic-cladding optical fiber 1 for reasons of bend stress. An increase in n-value means that the fiber becomes less fatigued by bend. For instance, when adhesion of the interracial surface is weak as mentioned above and when the void is caused by exfoliation of the cladding layer 3, the n-value becomes smaller, so that a possibility of occurrence of failure becomes higher. FIG. 2 is a graph showing a relationship between such an n-value and adhesion of the interfacial surface. The n-value required for the plastic-cladding optical fiber 1 of the present invention changes according to the application of the fiber. The n-value can be set to; for instance, 23 to 36.

There are several methods for measuring an n-value. By way of example, a static fatigue property when a plastic-cladding optical fiber is wound around a bobbin is described hereunder by reference to the drawings. Supposed as the optical fiber is an optical fiber 10 that has a structure in which a resin outer sheath is additionally provided around the plastic-cladding optical fiber 1 and that includes the core layer 2 and an outer sheath layer 11 including a cladding layer.

(Method for Measuring Static Fatigue Property)

Figure 3:
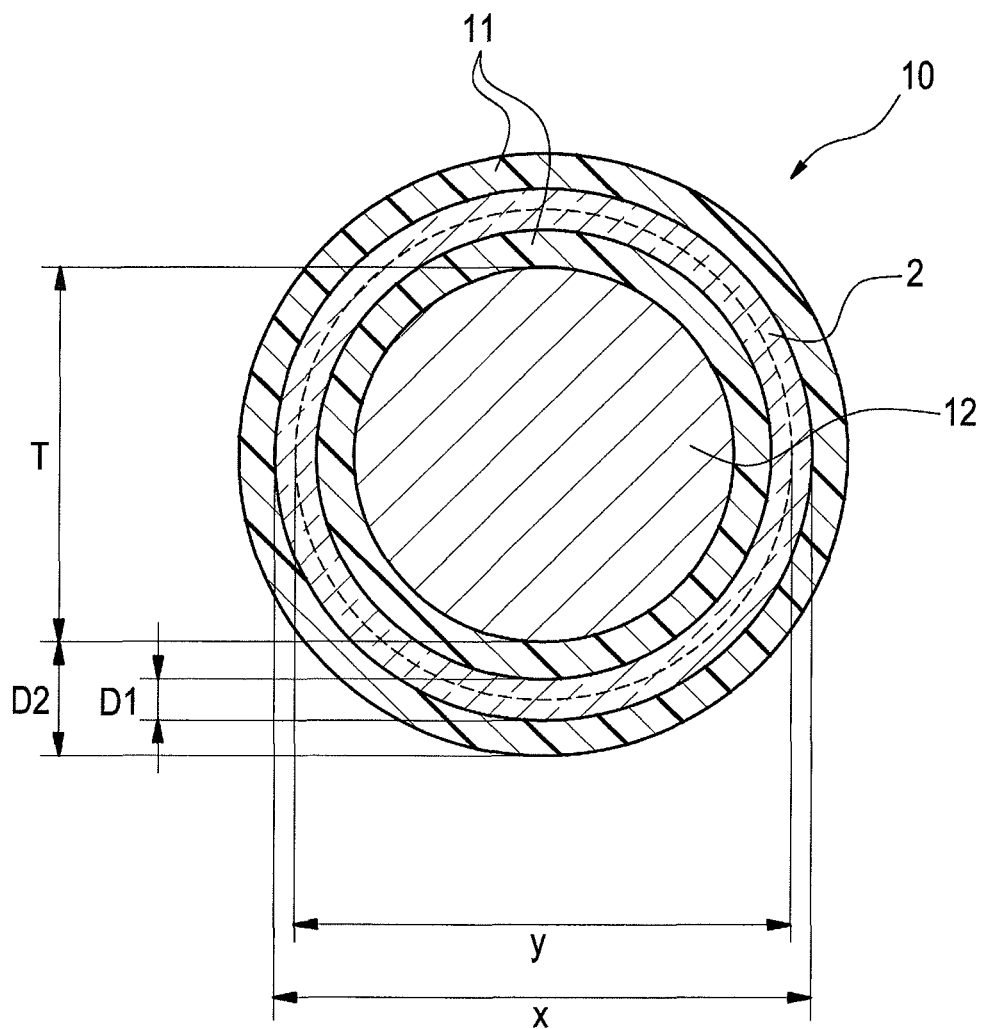
FIG. 3 is a schematic cross sectional view of a plastic-cladding optical fiber showing parameters required to calculate strain.
Figure 4:
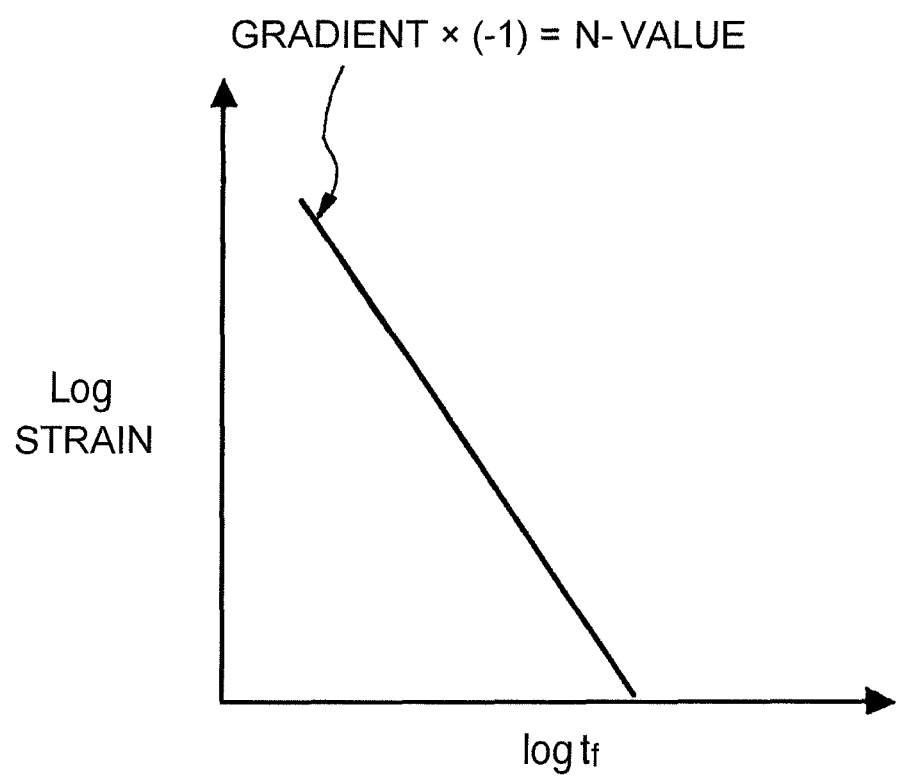
FIG. 4 is a graph for determining an n-value.

FIG. 3 is a schematic cross sectional view showing parameters required to calculate strain, depicting as a model a state in which the optical fiber 10 is wound around a mandrel 12. FIG. 4 is a conceptual graph for determining an n-value. (1) The optical fiber 10 was wound around each of rods (the mandrels 12) respectively having a different radius to one meter for each sample and then left. Times elapsed before the respective optical fiber 10 failed one after another were measured. The number of samples was set to; for instance, 15. (2) The median of the failure times (i.e., a time elapsed before 50% of samples were failed: $t_f$) was determined. When the number of samples was set to 15, the failure time elapsed before the eighth sample failed was taken as $t_f$. (3) Strain exerted on glass (the core layer 2) was calculated from a diameter (T) of the mandrel 12 that is a parameter value shown in FIG. 3, a glass diameter (a diameter of the core layer 2: $D_1$) of the optical fiber 10, and a diameter of the outer sheath (a diameter of the outer sheath layer 11: $D_2$).

$$\text{Strain} = \{(\text{a winding diameter of a periphery of the glass portion: "}x\text{")} - (\text{a winding diameter of the glass center: "}y\text{")}\} / \{(\text{a diameter of the mandrel: } T) + (\text{a diameter of the outer sheath layer: } D_2)\} = (\text{a glass diameter: } D_1) / \{(\text{a mandrel diameter: } T) + (\text{the diameter of the outer sheath layer: } D_2)\} = (\text{the glass diameter: } D_1) / \{(\text{the mandrel diameter: } T) + (\text{the diameter of the outer sheath layer: } D_2)\}$$

(4) As shown in FIG. 4, a gradient of a graph is determined by plotting a log strain vs. log $t_f$. A value determined by multiplying the gradient by −1 is an n-value.

Figure 5:
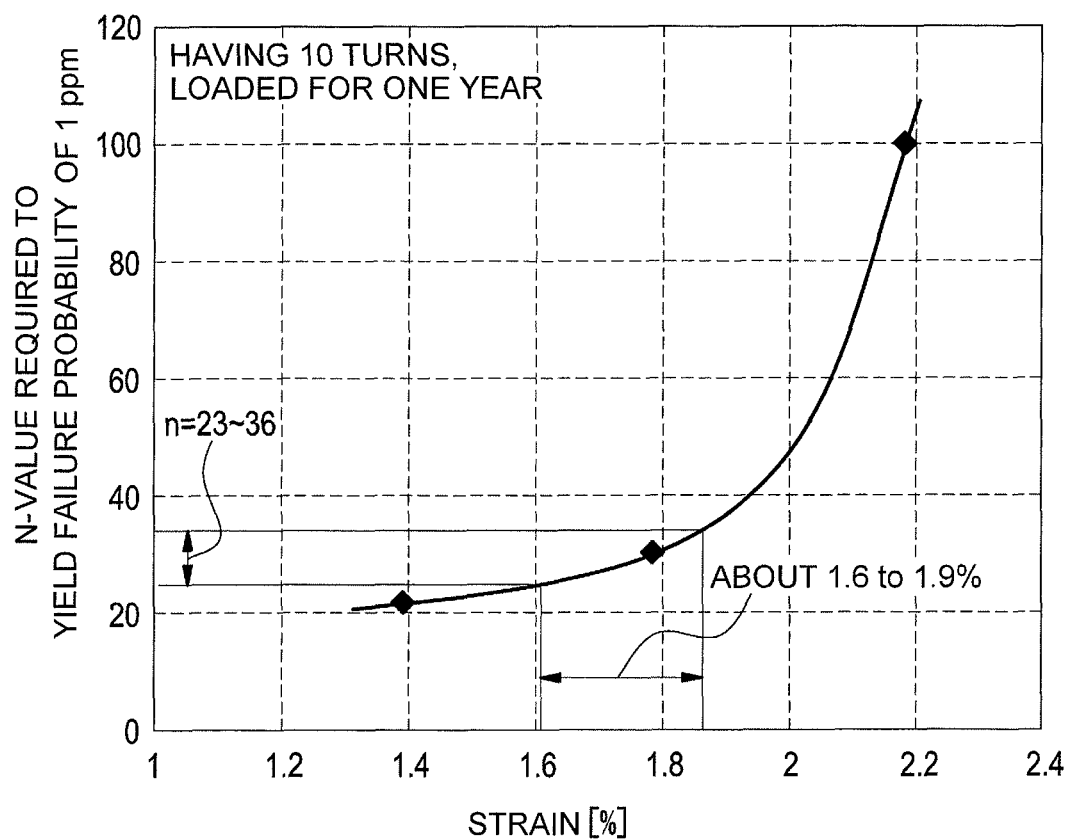
FIG. 5 is a graph showing a relationship between an n-value and the strain required to set failure probability to a value of 1 ppm.

A reason why the n-value is effective as a parameter for grasping a possibility of failure of an optical fiber (a possibility of failure) is now provided below. FIG. 5 is a graph showing a relationship between an n-value required to set a possibility of failure to a value of 1 ppm and strain. An optical fiber having a failure probability of $10^{-6}$ (1 ppm) shows that there is a probability of failure occurring one in every million. When the plastic-cladding optical fiber 1 of the present invention is assumed to hold 10 turns with a strain of 1.6 to 1.9% for one year, an n-value is required to range from 23 to 36 in order to achieve a failure probability of 1 ppm according to the application of the fiber. Such an n-value is effective as a parameter for grasping a possibility of occurrence of failure in the optical fiber.

Another embodiment of the plastic-cladding optical fiber 1 of the present invention is now described. In particular, the plastic-cladding optical fiber 1 of the present embodiment is especially made easy to handle as an optical fiber for use as an optical composite USB cable for home and an HDMI cable and has a minimum bend radius of 2.5 mm.

The minimum bend radius refers to a usable minimum bend radius. For instance, in relation to the plastic-cladding optical fiber 1 that has been used for general purpose and that includes the core layer 2 whose outer diameter is 200 μm and the cladding layer 3 whose outer diameter is 230 μm (the cladding layer has a thickness of 15 μm), the minimum bend radius is about 16 mm. In the meantime, the optical composite USB cable for home is sometimes used in a folded form. Therefore, the cable is required to be able to be used with 180 degrees bend. The minimum bend radius achieved at that time can be set to 2.5 mm or less. Since the bend radius may be made smaller in a comparatively easy manner, it is desirable to set the plastic-cladding optical fiber 1 to small diameters (the outer diameter of the core layer 2: 50 μm to 100 μm and the thickness of the cladding layer 3: 12 μm to 38 μm (the outer diameter of the cladding layer 3: 110 μm to 130 μm)).

In the case of such a small diameter plastic-cladding optical fiber 1, the n-value can also be determined by a 180 degree-bend test in order to make the test closer to an actual usage pattern. In the case of the small diameter plastic-cladding optical fiber 1 having the reduced minimum bend radius is sometimes required to assume a greater n-value. Therefore, it is desirable to set adhesion to 1.5 g/mm to 4.0 g/mm.

The following can be mentioned below as materials that make up the plastic-cladding optical fiber 1 of the present invention.

The cladding layer 3 is made by hardening a curable composition containing a fluorine-based UV curable resin. A resin that is preferable as the fluorine-based UV curable resin is a resin that can be hardened by means of an active energy radiation, like UV radiation. The fluorine-based UV curable resin exhibits a low refraction index with respect to quartz glass making up the core layer 2 and provides a hardened material exhibiting superior mechanical strength, flexibility, and transparency when a curable composition containing the resin is hardened. Such a resin includes a urethane (meth)acrylate compound containing fluorine atoms, a (meth)acrylate compound having fluorinated polyether within its structure, and a (meth)acrylated vinyl polymer containing fluorine atoms.

The urethane (meth)acrylate compound containing fluorine atoms can be acquired by means of causing; for instance, a (meth)acrylate compound containing fluorine atoms to react with a di-isocyanate compound. Moreover, the (meth)acrylate compound that contains fluorine atoms and that has polyether within its molecular structure can be made by causing; for instance, a (meth)alcohol compound containing fluorine atoms to react with a (meth)acrylate compound containing fluorine atoms or an acrylic acid.

In addition to the fluorine-based UV curable resin, there can also be used as the curable composition materials that are commonly used for forming the cladding layer 3 of the plastic-cladding optical fiber 1, like a polymeric unsaturated monomer such as N-vinyl caprolactam, a photo polymerization initiator provided below, a silane coupling agent expressed by a general formula (I) to be described later, and various additives.

It is especially desirable that a curable composition should contain a silane coupling agent so that defined adhesion can be realized; in particular, a silane coupling agent represented by the general formula (I) provided below.

[General Formula I]

In the formula (I), reference symbol Z designates a (meth)acryl group, a mercapto group, or an epoxy group. Reference symbol X denotes $—OCH_3$, $—OC_2H_5$, or $CH_3$. At least one of reference symbols X is $—OCH_3$ or $—OC_2H_5$. Although $—OC_2H_5$ sufficiently works, $—OCH_3$ is more preferable in terms of strength. Reference symbol R denotes $C_nH_n$ (n=1, 2, and 3).

It is desirable to use a curable composition except the silane coupling agent whose refractive index assumes a value of 1.401 to 1.450 as a result of hardening of the composition. The word "composition except the silane coupling agent" means polymeric compounds, photo polymerization initiators, and UV curable resins (not including volatile solvents, or the like, that are added only to dissolve a material). Curable compositions having refractive indices (specifically, 1.401, 1.413, 1.430, and 1.450) falling in the range are ascertained to exhibit both superior tensile strength of the optical fiber and a superior transmission characteristic. When the refractive index exceeds 1.450, a difference between the refractive index of the fiber and the refractive index of the core layer 2 becomes small and unsuitable for letting an optical signal propagate. Moreover, when a decrease occurs in compatibility between the silane coupling agent and a fluorine-based UV curable resin, or the like, serving as a principal material making up the cladding layer 3, the resin forming the cladding layer 3 becomes whitish, which in turn deteriorates the transmission characteristic. In the curable composition, the refractive index of the curable composition mixed with a component except the silane coupling agent of the cladding layer 3 is set so as to fall within the numerical range set forth, whereby compatibility between the fluorine-based UV resin serving as a principal material forming the cladding layer 3 and the silane coupling agent is assured. In order to set the refractive index of the curable composition achieved after curing the component except the silane coupling agent so as to fall within a range from 1.401 to 1.450, a fluorine content in the UV curable resin or a type of a resin is adjusted, as required, whereby the setting can be implemented.

It is desirable that the curable composition should contain 0.05 to 6 wt parts silane coupling agent represented by the general formula (I) with respect to 100 wt parts components contained in the curable composition except the silane coupling agent. It is further desirable that the curable composition should contain 0.2 to 4 wt % the silane coupling agent. The curable composition that is to form the cladding layer 3 is caused to contain the silane coupling agent represented by the general formula (1) within the numerical range, whereby a degree of decrease in dynamic contact angle of the curable composition during one initial second before hardening of the curable composition can be increased; namely, the curable composition and the core layer 2 conform to each other within a short period of time. Therefore, adhesion between the cladding layer 3 and the core layer 2, which are resultantly formed, can be enhanced to a much greater extent. When a quantity of silane coupling agent that is represented by the general formula (I) and that is to be added is less than 0.05 wt parts, an advantage of an increase in adhesion is not yielded. In the meantime, when the quantity of silane coupling agent to be added exceeds 6 wt parts, tensile strength of the optical fiber is increased, whilst compatibility between the silane coupling agent represented by the general formula (I) and the fluorine-based UV curable rein is decreased, which arouses a concern about deterioration of the transmission characteristic as a result of the resin becoming whitish.

Any known optical polymerization initiators can also be used as the optical polymerization initiator for the curable composition; however, they are required to exhibit superior storage stability after being blended. For instance, 2-hydroxy-2-methyl-1-phenylpropane-1-on, and the like, can be mentioned as specific examples of such an optical polymerization initiator.

EXAMPLE

Results of evaluation tests using examples of the present invention and comparative examples are provided hereunder, and the present invention is described in more detail. The present invention, however, is not limited to the examples.

The cladding layer was formed from urethane (meth)acrylate compound containing fluorine atoms, and evaluation of adhesion and an n-value were carried out according to the following procedures by use of optical fiber samples (Examples 1 through 5, and Comparative examples 1 and 2) provided in Table 1.

TABLE 1

| | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 |
|---|---|---|---|---|---|---|---|
| STRAIN [%] | 1 | 2 | 1 | 1.9 | 1.9 | — | 1.9 |
| MANDREL DIAMETER | 5 | 5 | 5 | 4 | 4 | — | 4 |
| CORE DIAMETER | 50 | 100 | 50 | 80 | 80 | 80 | 80 |
| CLADDING DIAMETER | 125 | 125 | 125 | 125 | 125 | 125 | 125 |
| SILANE COUPLING AGENT [wt %] | 0.2 | 0.5 | 1 | 0.4 | 4 | 7 | 0 |
| ADHESION [g/mm] | 1.5 | 3 | 3.5 | 2.7 | 3.9 | — | 1.1 |
| N-VALUE | 20 | 30 | 31 | 28 | 35 | — | — |
| FAILURE PROBABILITY | | | 1 ppm OR LESS | | | — | MORE THAN 1 ppm |
| DETERMINATION | | | NONDEFECTIVE | | | DEFECTIVE (CLADDING MATERIAL BECAME WHITISH, HIGH TRANSMISSION LOSS) | DEFECTIVE (HIGH FAILURE PROBABILITY) |

(Method for Measuring Adhesion)

(1) A predetermined quantity of silane coupling agent was added to a bottle including a sample adjustment curable composition, and a resultant mixture was rotationally agitated at 70 rpm for one hour. (2) A resultant mixture was left for two hours in an agitation-degassing thermostatic bath 60° C., and it was checked that the mixture contains no air bubbles. (3) Film formation plate glass (a large-sized slide glass measuring 76×52 mm) was coated with a curable composition doped with the silane coupling agent, through spin coating, in such a way that the thickness comes to 10 μm. The thus-coated glass was exposed to UV radiation of 100 mJ/cm², to thus become hardened, whereupon a resin film was formed over the plate glass. (4) After having been left at room temperature for 24 hours or more in a peel test, the resin film was notched. An ultra-thin tape made of polyester (No. 9391 manufactured by Sumitomo 3M Co., Ltd.) was affixed. One end of the glass and one end of the polyester tape were pinched with chucks of a tensile strength tester (STROGRAPH manufactured by Toyo Seiki Co., Ltd.), thereby measuring 180-degree peel strength. A load cell of 50N was used for measurement, and tensile strength was set to 100 mm/min.

(Method for Evaluation of an N-Value)

An n-value was calculated by means of the method for measuring the static fatigue property.

Table 1 shows evaluation results of the respective examples. Samples that have n-values of 20 or more and a failure probability of 1 ppm or less calculated from an actually measured n-value and actually measured core diameters were taken as nondefective.

As can be seen from Table 1, it was ascertained that the Examples 1 through 5 possessing adhesion of 1.5 g/mm to 4.0 g/mm satisfied the requested n-value.

While the present inventive concept has been shown and described with reference to certain exemplary embodiments thereof, it will be understood by those skilled in the art that various changes in form and details may be made therein without departing from the spirit and scope of the invention as defined by the appended claims.

What is claimed is:

1. A plastic-cladding optical fiber comprising:
   a core layer made of quartz glass; and
   a cladding layer formed by hardening a curable resin composition over a periphery of the core layer,
   wherein adhesion between the core layer and the cladding layer ranges 1.5 g/mm to 4.0 g/mm.

2. The plastic-cladding optical fiber according to claim 1, wherein the fiber is usable at a bend radius of 2.5 mm.

3. The plastic-cladding optical fiber according to claim 1, wherein a diameter of the core layer ranges from 50 μm to 100 μm, and a thickness of the cladding layer ranges from 12 μm to 38 μm.

4. The plastic-cladding optical fiber according to claim 2, wherein a diameter of the core layer ranges from 50 μm to 100 μm, and a thickness of the cladding layer ranges from 12 μm to 38 μm.

5. A plastic-cladding optical fiber comprising:
   a core layer made of quartz glass; and
   a cladding layer formed by hardening a curable resin composition over a periphery of the core layer,
   wherein the curable resin composition contains a fluorine-based UV curable resin and a silane coupling agent represented by the general formula (1) provided below,
   wherein the fluorine-based UV curable resin is selected from a urethane (meth)acrylate compound containing fluorine atoms, a (meth)acrylate compound having fluorinated polyether within its structure, and a (meth)acrylated vinyl polymer containing fluorine atoms,
   wherein adhesion between the core layer and the cladding layer ranges 1.5 g/mm to 4.0 g/mm

[General Formula 1]

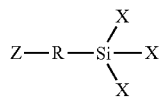

* * * * *